United States Patent [19]
Kong

[11] Patent Number: 5,828,831
[45] Date of Patent: Oct. 27, 1998

[54] SYSTEM FOR PREVENTING UNAUTHORIZED USE OF A PERSONAL COMPUTER AND A METHOD THEREFORE SECURITY FUNCTION, AND METHODS OF INSTALLING AND DETACHING A SECURITY DEVICE TO/FROM A COMPUTER

[75] Inventor: Won-keun Kong, Suwon, Rep. of Korea

[73] Assignee: Samsung Electronics Co., Ltd., Kyungki-Do, Rep. of Korea

[21] Appl. No.: 695,439

[22] Filed: Aug. 12, 1996

[30]     Foreign Application Priority Data

Aug. 10, 1995  [KR]  Rep. of Korea .................. 1995-24698

[51] Int. Cl.[6] ..................................... G06F 11/00
[52] U.S. Cl. ............... 395/186; 395/187.01; 395/188.01; 395/20.59
[58] Field of Search ..................................... 395/218, 186, 395/187.01, 188.01, 652

[56]                References Cited

U.S. PATENT DOCUMENTS 5,375,243  12/1994  Parzych et al. .......................... 395/725
5,469,564  11/1995  Junya ................................. 395/188.01
5,535,409   7/1996  Larvoire et al. .......................... 395/800
5,537,544   7/1996  Morisawa et al. .................. 395/188.01

*Primary Examiner*—Robert W. Beausoliel, Jr.
*Assistant Examiner*—Elisca Pierre Eddy
*Attorney, Agent, or Firm*—Sughrue, Mion, Zinn, Macpeak & Seas, PLLC

[57]            ABSTRACT

A personal computer having a security function, a security method therefor, and methods of installing and detaching a security device are provided. The personal computer includes: an input/output and memory portion for inputting, outputting and storing a password; a hard disk for storing the password and a boot sector without partition, which is booted in response to a booting permission signal; a security program storing portion for storing the password and for generating the booting permission signal in response to an initializing signal according to whether the password is valid and whether the hard disk is the hard disk initially installed in the system, and having a boot sector program with partition, and a boot sector protection program for protecting the boot sector of the hard disk; a security portion for processing the boot sector protection program and for performing both read and write operations, the security portion including the security program storing portion; and a central controller for controlling the hard disk, the input/output and memory portion, and the security portion, and for generating the initializing signal when power is turned on, wherein the hard disk is booted in response to whether the security portion exists and whether the security portion is the initially installed security portion. Therefore, a booting control security function can be provided using the boot sector of the hard disk and a security function of the boot sector of the hard disk and data can also be provided.

18 Claims, 6 Drawing Sheets

SYSTEM FOR PREVENTING UNAUTHORIZED USE OF A PERSONAL COMPUTER AND A METHOD THEREFORE SECURITY FUNCTION, AND METHODS OF INSTALLING AND DETACHING A SECURITY DEVICE TO/FROM A COMPUTER

BACKGROUND OF THE INVENTION

The present invention relates to a personal computer (PC), and more particularly, to a PC having a security function, a security method therefor, and methods of installing and detaching a security device in and from the PC.

Currently, PC's are being used by many different kinds of people for various applications, some of which involve highly sensitive information. Thus, a PC user has been provided with various measures for securing such information.

A PC security method has three aspects: a first aspect of preventing an unauthorized user from booting the PC; a second aspect of preventing the usage of input devices such as a keyboard or mouse; and a third aspect of preventing valuable information from being read and copied.

The above security method generally requires a user to input a password for permitting the use of PC. However, if the password is revealed, the conventional PC protection function is useless.

Furthermore, it is not difficult for an unauthorized user who doesn't know the password to find it on a hard disk. Thus, an unauthorized user can copy valuable information from the booted PC without permission, thereby exposing information. Also, even if the PC includes a security device, it may be detached from the PC by an unauthorized user and the hard disk thereof may be accessed to expose information.

SUMMARY OF THE INVENTION

It is an object of the present invention to provide a PC having a security portion which controls the booting operation using a password and protects the data of a hard disk.

It is another object of the present invention to provide a PC security method supplying a booting control security function using a security portion having an EEPROM and a boot sector of a hard disk and a security function therefor.

It is still another object of the present invention to provide a method for installing the security portion in the PC.

It is yet another object of the present invention to provide a method of detaching the security portion from the PC.

According to an aspect of the present invention, there is provided a personal computer having a security function comprising: an input/output and memory portion for inputting, outputting and storing a password; a hard disk for storing the password and a boot sector without partition, which is booted in response to a booting permission signal; a security program storing portion for generating the booting permission signal according to whether the password is valid and whether the hard disk is the hard disk initially installed in the system in response to an initializing signal, having a boot sector program with partition, and storing the password, and a boot sector protection program for protecting the boot sector of the hard disk; a security portion for processing the boot sector protection program and for performing both read and write operations, having the security program storing portion; and a central controller for controlling the hard disk, the input/output and memory portion, and the security portion, and for generating the initializing signal when power is turned on, wherein the hard disk is booted in response to whether the security portion exists and whether the security portion is the initially installed security portion.

According to another aspect of the present invention, there is provided a security method for a personal computer including a hard disk and security portion for storing various security programs for the personal computer, in which the booting of the personal computer is controlled and the boot sector of the hard disk is protected, the security programs including a booting control program and a boot sector protection program, wherein the booting control program is executed through the steps of: (a) preventing the booting of the personal computer if a password input by a user is not valid; (b) terminating the booting of the personal computer if the security portion is detached; (c) controlling the input/output of data to/from the hard disk by using the security portion if the security portion is the same as that initially installed together with the hard disk; and (d) booting the hard disk, where the boot sector protection program is executed through the steps of: (a') determining whether the disk to be used is the hard disk of the personal computer if a disk control command is input from the user; (b') determining whether the disk control command is for reading information from the boot sector if the disk is determined to be the original hard disk of the personal computer; (c') outputting the content of the boot sector stored in the security portion if it is determined in the step (b') that the disk control command is for reading; (d') determining whether the disk control command is for writing information in the boot sector if it is determined in the step (b') that the disk control command is not for reading; (e') performing an original disk interrupt operation of the personal computer to complete the process required from the disk control command if the disk control command is not for writing or if it is determined in the step (a') that the disk is not the original hard disk of the personal computer; and (f) completing the process required from the disk control command if the disk control command is for writing.

According to still another aspect of the present invention, there is provided a method of installing a security portion in a personal computer for security of the personal computer, comprising the steps of: connecting the security portion to a hard disk and a central controller of the personal computer; storing an original booting data of a boot sector of the hard disk in a special file; installing a new booting data in the boot sector; copying the new booting data installed in the boot sector in the security portion; removing only a partition from the new booting data so as to prevent the personal computer from being used without the security portion; and registering a password and an identification number of the personal computer in the hard disk and the security portion.

According to yet another aspect of the present invention, there is provided a method of detaching a security portion from a personal computer for security of the personal computer, wherein the method is performed by installing again an original booting data stored as a special file in the boot sector of the personal computer and removing the password, by only an authorized user.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
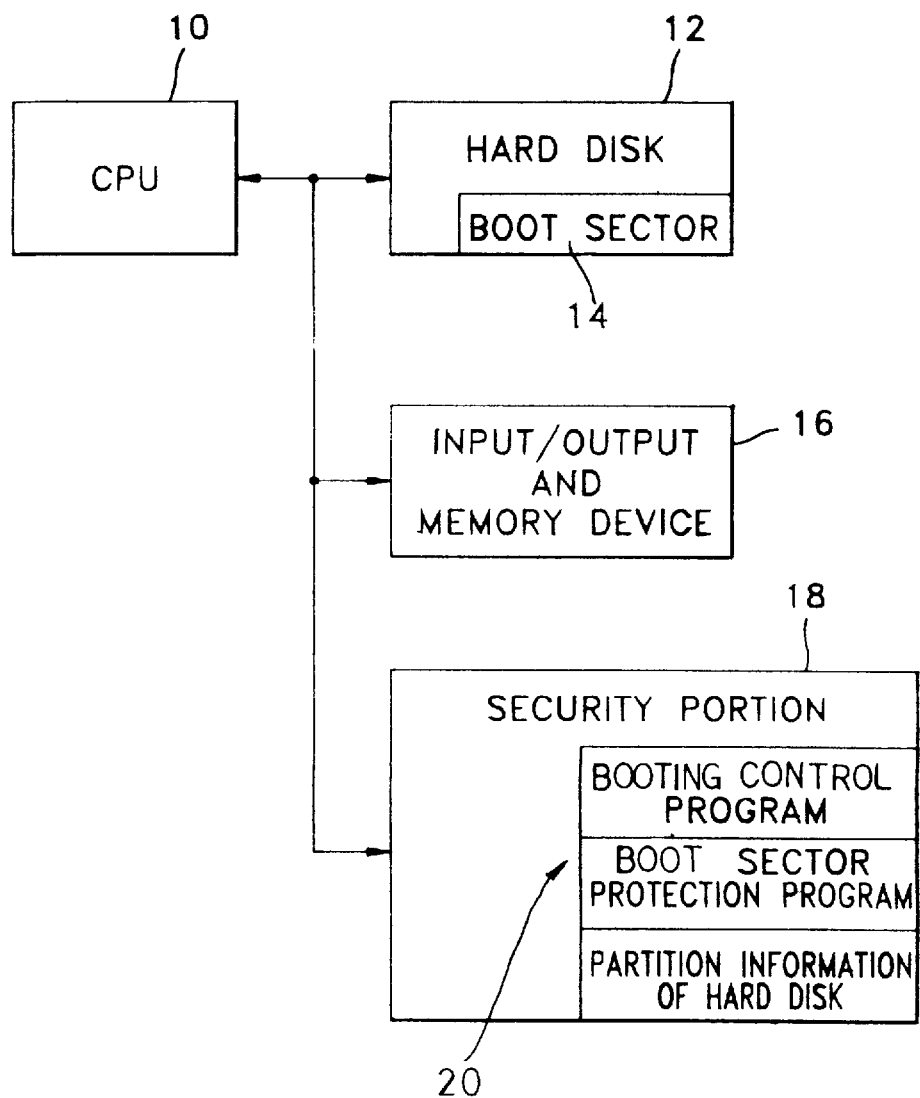
FIG. 1 is a block diagram of a PC having a security function according to the present invention.

As shown in FIG. 1, a PC having a security function according to the present invention is comprised of a central processing unit (CPU) 10, a hard disk 12, an input/output and memory device 16, a security program storing portion 20 and a security portion 18.

The CPU 10 is for controlling the hard disk 12, the input/output and memory device 16, and the security portion 18, and for generating an initializing signal when power is turned on. The hard disk 12 stores a password and boot sector 14 without partition and is booted in response to a booting permission signal, based on whether or not the security portion 18 exists, and whether or not it corresponds to the initially installed security portion 18. The input/output and memory device 16 is for storing a password, and the security program storing portion generates the booting permission signal in response to an initializing signal if the password is valid and the hard disk 12 is the hard disk initially installed in the system. Also, the security program storing portion stores a boot sector with partition, the password, a booting control program, a boot sector protection program for protecting the boot sector 14 of the hard disk 12, and partition information of the hard disk 12. The security portion 18 is able to perform both read and write operations and includes the security program storing portion 20 and processes the boot sector protection program.

For constructing the PC, the CPU 10, the hard disk 12 and the input/output and memory device 16 are connected to each other via a bus using corresponding adapters.

According to the PC of the present invention, a booting control program is stored in the boot sector 14 of the hard disk 12 and security programs are stored in the security program storing portion 20 which may be realized using an electrically erasable and programmable ROM (EEPROM). The booting control programs each stored in the boot sector 14 and the security program storing portion 20 execute a procedure for verifying each other for a perfect security. Here, if one program fails to verify the existence of the other program, the PC cannot be booted.

The PC's microprocessor can read from and write to the EEPROM 20. Thus, the EEPROM 20 can store the user's password, a copy of the boot sector 14 of the hard disk 12 and programs to be actively or passively performed for security. Thus, even though an unauthorized user removes the security portion 18 from the PC and boots the hard disk 12 using another floppy diskette, it is impossible to use the PC since partition information of the hard disk 12 is stored only in the EEPROM 20.

Figure 2:
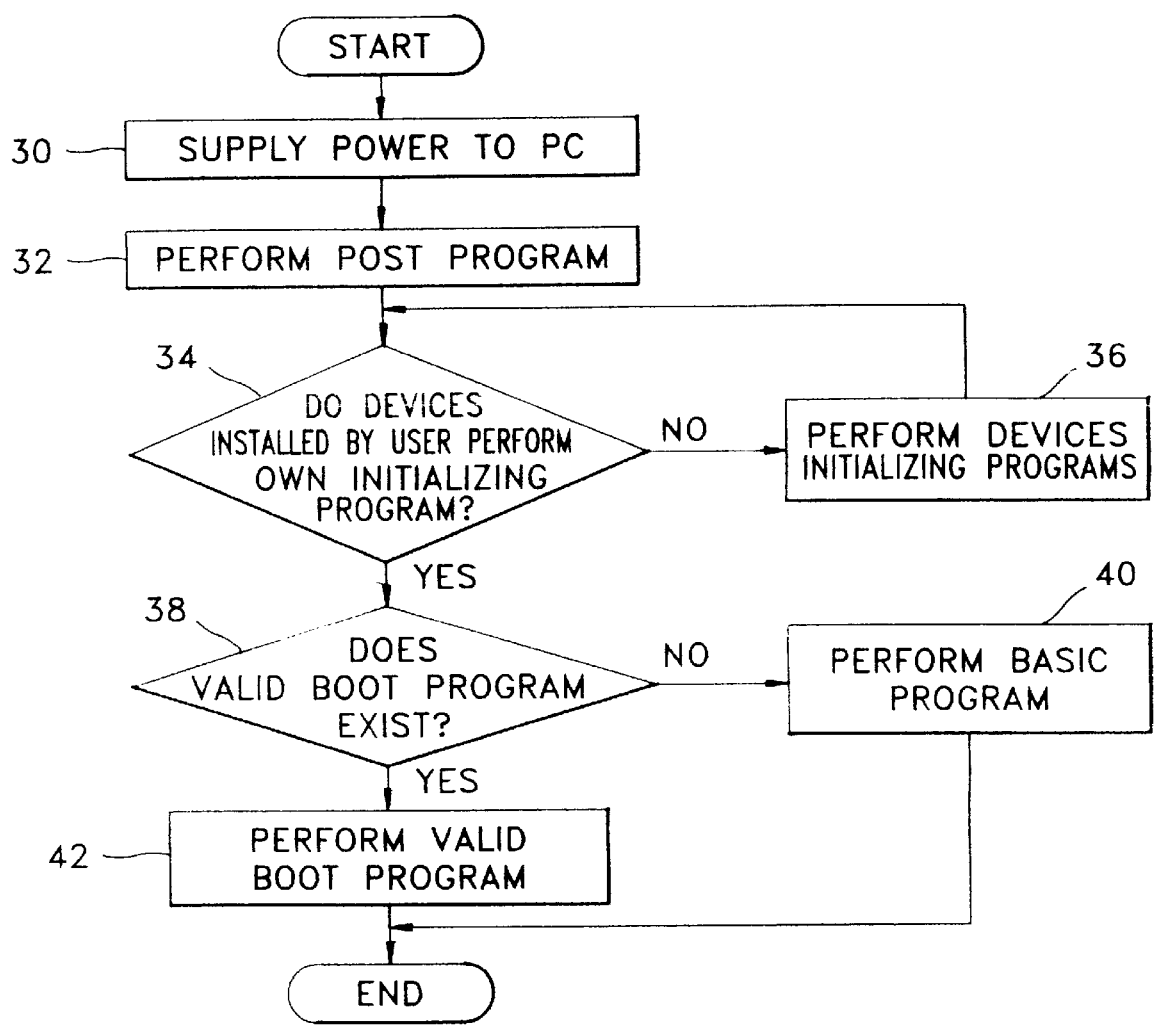
FIG. 2 is a flowchart illustrating a general booting procedure of a PC.

A general booting procedure of the PC will be described with reference to FIG. 2.

When power is provided to the PC (Step 30), the PC performs a power on self-test (POST) for testing various internal elements and for an initialization (Step 32). The POST program for Step 32 is stored in a ROM of the input/output and memory device 16. After Step 32, the PC determines whether or not devices optionally installed in the PC by the user have a respective execution program in a predetermined range of addresses. If the execution program exists, it is determined whether or not the corresponding device is initialized (Step 34). If the initialization is not performed, the corresponding device is initialized by the PC all over the predetermined address range (Step 36). After the initializing programs have been performed, the PC starts to perform a booting procedure. After completely checking to see which devices have a boot program, it is determined whether a valid boot program exists in each device (Step 38). If the valid boot program does not exist, the PC performs a basic program stored in the ROM of the input/output and memory device 16 (Step 40). However, if the valid boot program exists, each valid boot program of the devices is executed (Step 42).

Figure 3:
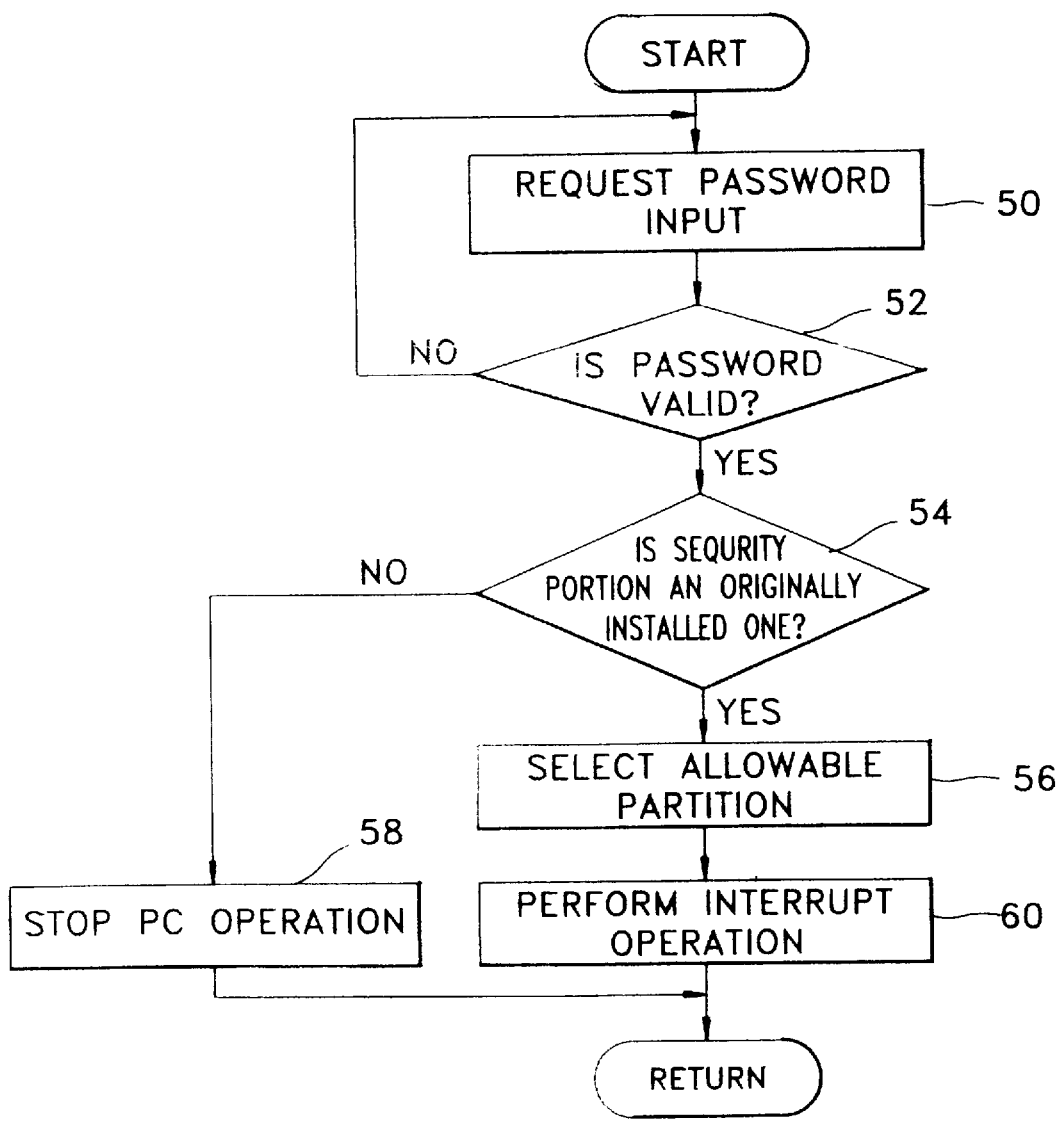
FIG. 3 is a flowchart illustrating a method of controlling the booting of the PC according to the present invention.

The method of initializing the security portion 18, performed in Step 36 of FIG. 2, that is, a method of controlling the booting of the PC according to the present invention, will be described with reference to FIG. 3.

The PC requests a user to input a password (Step 50). Then, the initializing program stored in the hard disk 12 determines whether the password input from the user is valid (Step 52). Here, the password can be stored wherever data can be written and read. That is, the password may be stored in the hard disk 12, the security program storing portion 20 of the security portion 18, a floppy diskette, a non-volatile memory, a terminal connected to the PC and/or a card reader.

In Steps 50 and 52, the password is continuously requested if the input password is not valid, so that the booting of the PC is held at a first security step. If it is determined that the password is valid in Step 52, the PC compares its own identification (ID) number of the security portion 18 with a is corresponding ID number stored in the boot sector 14 of the hard disk 12 for mutual authentication, to verify whether the PC is the same as the PC in which it was initially installed (Step 54). If the ID number of the security portion 18 does not match the ID number in the boot sector 14 or does not exist in the boot sector 14, the operation of the PC is terminated (Step 58). Steps 54 and 58 are the second security steps for preventing the installed security portion 18 from being detached from the PC, or the PC from being booted by another replaced hard disk. If the condition of Step 54 is satisfied, an allowable partition of the hard disk 12 is selected according to a password input by the user (Step 56). Then, the security portion 18 performs an intercepting operation at the occurrence of a disk I/O interrupt (Step 60). Step 56 is for preventing the data stored in the PC from being copied by an unauthorized user using an auxiliary memory device.

Figure 4:
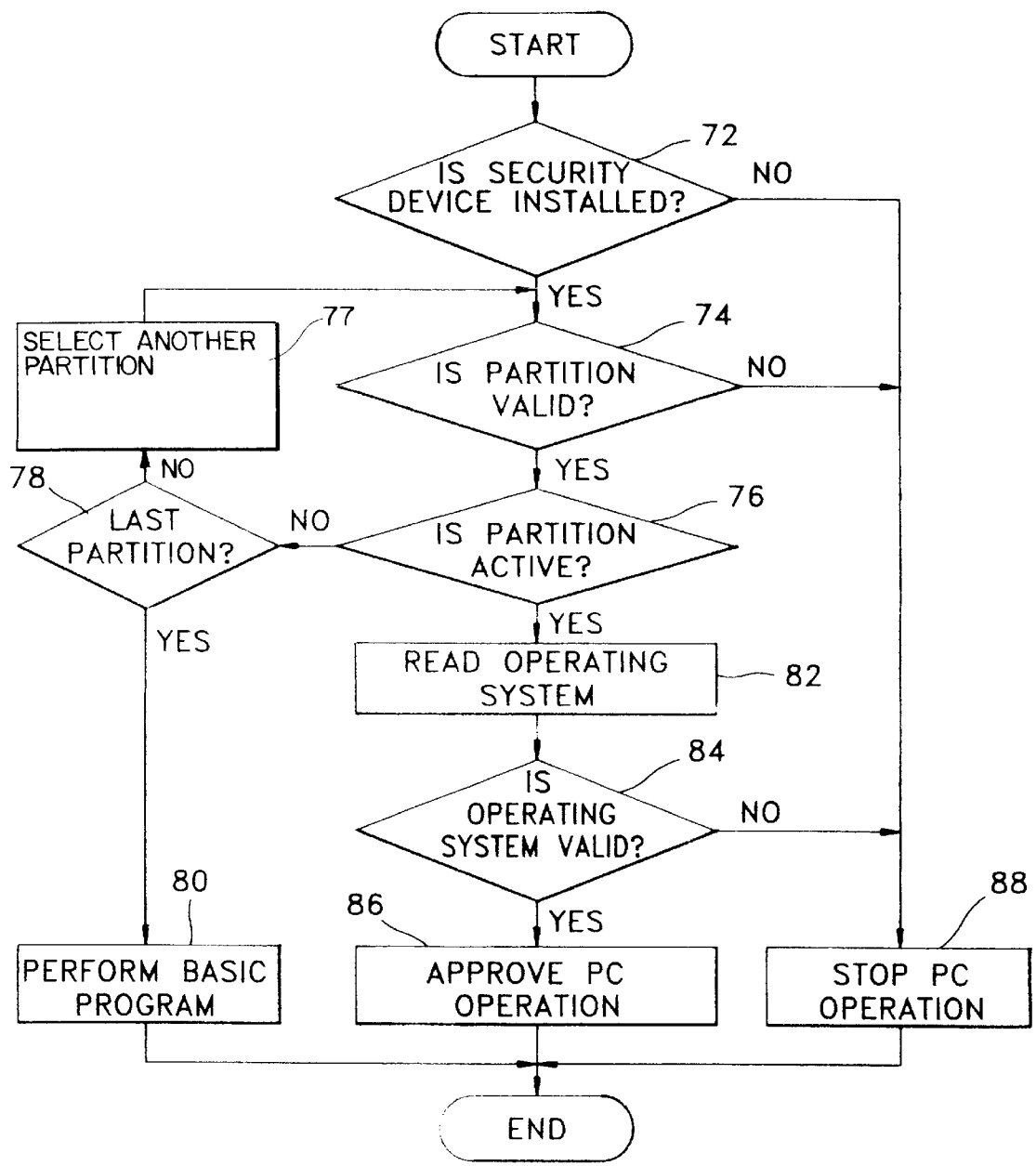
FIG. 4 is a flowchart illustrating Step 42 of FIG. 2.

Step 42 of FIG. 2 will be described with reference to FIG. 4 as follows.

First, the CPU 10 checks to see whether the security portion 18 is installed in the PC (Step 72). If the security portion 18 has been removed from the PC, the operation of the PC is terminated (Step 88). Otherwise, it is determined whether a partition stored in the security program storing portion 20 of the security portion 18 is valid (Step 74). If the partition is not valid, the operation of the PC is terminated (Step 88). However, if the partition is valid, it is determined whether the partition is active or not (Step 76). If a partition is valid but not active, it is then determined whether or not it is the last partition of the hard disk 12 (Step 78). If the partition is determined to be a partition other than the last partition, another partition is selected (Step 77) and control returns to Step 74.

Here, a partition able to read data and a partition having an operating system are named as a "valid partition" and an "active partition", respectively. For example, a hard disk may be divided into several drives. Here, supposing that the hard disk is divided into four drives, each drive corresponds to a partition, with the C drive having the operating system corresponds to the active partition.

If the current partition is determined to be the last one, that is, if there is no active partition, a basic program is performed (Step 80).

On the other hand, in Step 76, if the partition is active, the operating system is read therefrom (Step 82) and then it is determined whether or not the operating system is valid (Step 84). Here, if the operating system is not valid, the operation of the PC is terminated (Step 88). On the contrary, if the operating system is valid, control of the PC is transferred to the valid operating system (Step 86).

Figure 5:
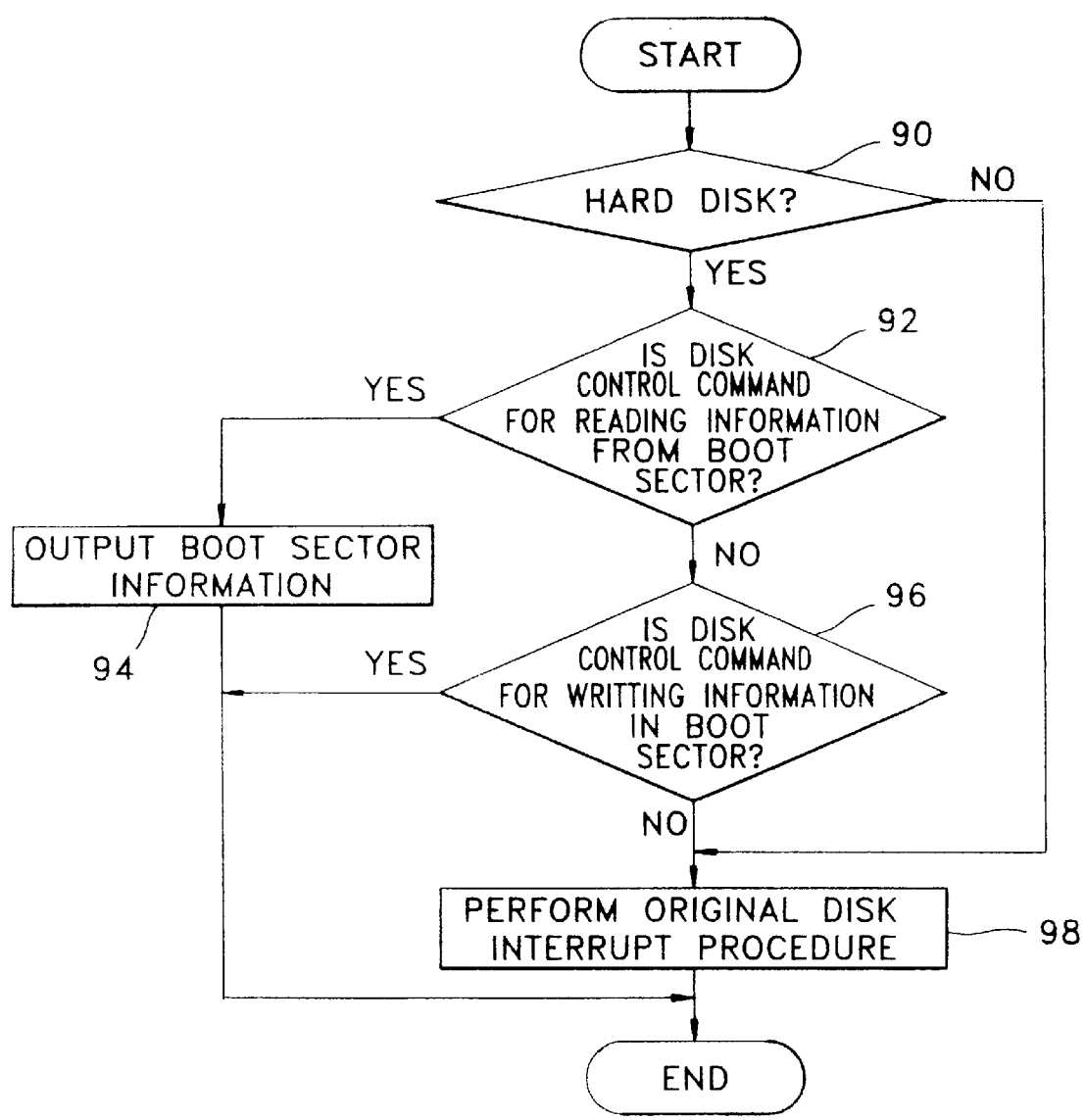
FIG. 5 is a flowchart illustrating a protection program for a boot sector of a hard disk, which is programmed in the EEPROM of a security portion according to the present invention.

FIG. 5 is a flowchart illustrating a procedure for processing the boot sector protection program stored in the EEPROM 20. That is, the procedure is for processing a disk input/output command in the execution of user's commands by the operating system which gains a control right to the PC after the booking procedure is normally completed.

If a disk control command is input from the user, a disk interrupt processing procedure stored in the EEPROM 20 is performed. First, the hard disk currently installed in the PC is examined to determine whether or not it is the original hard disk 12 installed in the PC (Step 90). If the disk is not the hard disk 12 of the PC, an "original disk" interrupt procedure initiated by the PC is performed (Step 98). Otherwise, if the disk is the hard disk 12 of the PC, it is determined whether or not the disk control command is for reading information from the boot sector (Step 92). If the condition of Step 92 is satisfied, the contents of the boot sector stored in the EEPROM 20 is output (Step 94). However, if it is determined that the disk control command is not for reading, it is determined whether or not it is for writing information to the boot sector (Step 96). Here, if it is determined that the disk control command is for writing, the disk control command is disregarded, thereby completing the boot sector protection program. On the contrary, if it is determined that the disk control command is not for writing, the original disk interrupt procedure initiated by the PC is performed (Step 98), thereby completing the boot sector protection program.

Figure 6B:
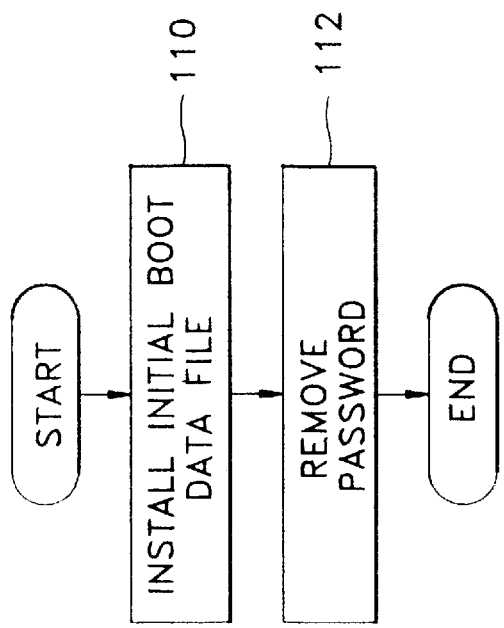
FIG. 6B is a flowchart illustrating a method of detaching the security portion from the PC according to the present invention.
Figure 6A:
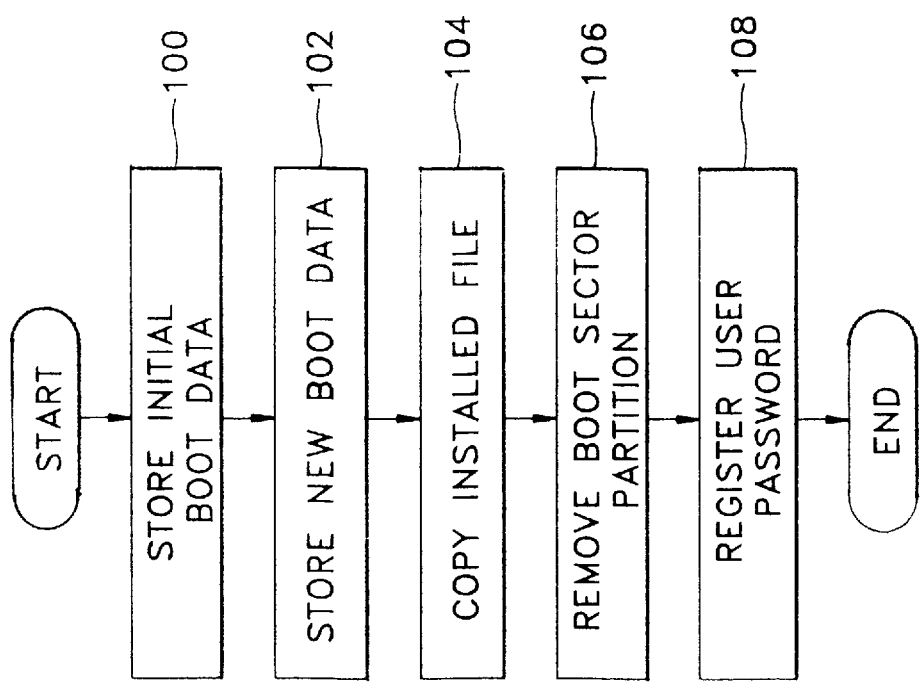
FIG. 6A illustrates a method for installing the security portion in the PC according to the present invention.

The methods of installing and detaching the security portion 18 in and from the PC according to the present invention will be described with reference to FIGS. 6A and 6B.

When the installation of the security portion 18 is initiated, an initial booting data stored in the boot sector 14 of the hard disk 12 installed in the original PC is stored in a special file (Step 100), and then a new booting data file is stored in the boot sector 14 of the hard disk 12 for security (Step 102). Next, the contents of the newly installed booting data file in the boot sector 14 of the hard disk 12 are copied in the EEPROM 20 (Step 104). After Step 104, the partition of the boot sector 14 stored in the hard disk 12 is removed (Step 106) to prevent the system from being used without any security portion. Then, the password and the identification number of the PC are registered in the hard disk 12 and EEPROM 20 (Step 108), thereby completing the installation of the security portion 18.

The detaching operation of the security portion 18 is permitted for only an authorized user. First, the special file having the initial booting data is installed in the boot sector 14 of the hard disk 12 to return the boot sector 14 to the initial state (Step 110). Then, the password stored in the EEPROM 20 is removed (Step 112), thereby completing the detaching operation of the security portion 18.

As described above, according to the PC having a security function, the security method therefor, and methods of installing and detaching the security device of the present invention, the operation of the PC is controlled according to whether the security device exists. That is, if there is no security device, the operation of the PC is terminated. Also, even if the PC is booted by an unauthorized user using a floppy diskette, the hard disk cannot be used since the partition data of the hard disk is not included. Therefore, protection of the boot sector of the hard disk is accomplished.

What is claimed is:

1. A personal computer having a security function comprising:

input/output and memory means for inputting, outputting and storing a password;

a hard disk for storing the password and a boot sector without partition, the boot sector being booted in response to a booting permission signal;

security program storing means for storing the password and a boot sector protection program for protecting the boot sector of said hard disk, said security program storing means also for generating, in response to an initializing signal, the booting permission signal according to whether the password is valid and whether said hard disk is a hard disk which was installed in said personal computer when said security program storing means was initially installed in said personal computer, said security program storing means having a boot sector program with partition;

security means for processing the boot sector protection program and for performing both read and write operations, said security means including said security program storing means; and a central controller for controlling said hard disk, said input/output and memory means, and said security means, and for generating the initializing signal when power is turned on, wherein said hard disk is booted in response to whether said security means exists and whether said security means is an initially installed security means.

2. A security method for a personal computer including a hard disk and security means for storing various security programs for the personal computer, in which booting of the personal computer is controlled and the boot sector of said hard disk is protected, said security programs including a booting control program and a boot sector protection program, wherein said booting control program is executed through the steps of:

(a) preventing the booting of the personal computer if a password input by a user is not valid;

(b) terminating the booting of the personal computer if said security means is detached;

(c) controlling input/output of data to/from said hard disk by using said security means only if said security means is the same as that which was initially installed together with said hard disk; and (d) booting said hard disk.

3. A method according to claim 2, wherein said boot sector protection program is executed through the steps of:

(a') determining whether a disk to be used is the hard disk of the personal computer if a disk control command is input from the user;

(b') determining whether the disk control command is for reading information from the boot sector if the disk to be used is determined to be an original hard disk of the personal computer;

(c') outputting the content of the boot sector stored in said security means if it is determined in said step (b') that the disk control command is for reading;

(d') determining whether the disk control command is for writing information in the boot sector if it is determined in said step (b') that the disk control command is not for reading;

(e') performing an original disk interrupt operation of the personal computer to complete a process required from the disk control command if the disk control command is not for writing or if it is determined in said step (a') that the disk is not the original hard disk of the personal computer; and (f') completing the process required from the disk control command if the disk control command is for writing.

4. A security method of a personal computer as claimed in claim 3, wherein said security means is an EEPROM.

5. A security method of a personal computer as claimed in claim 4, wherein said step (a) comprises the sub-steps of:

requesting a user of the personal computer to input the password if said security means is initialized; and continuously requesting the user of the personal computer to input the password if the input password is not valid.

6. A security method of a personal computer as claimed in claim 5, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

7. A security method of a personal computer as claimed in claim 4, wherein said step (b) comprises the sub-steps of:

determining whether said security means is the same as that initially installed in the personal computer and said hard disk is the same as that initially installed in the personal computer if the password is valid;

s terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

8. A security method of a personal computer as claimed in claim 3, wherein said step (a) comprises the sub-steps of:

requesting a user of the personal computer to input the password if said security means is initialized; and continuously requesting the user of the personal computer to input the password if the input password is not valid.

9. A security method of a personal computer as claimed in claim 8, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

10. A security method of a personal computer as claimed in claim 3, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

11. A security method of a personal computer as claimed in claim 2, wherein said security means is an EEPROM.

12. A security method of a personal computer as claimed in claim 11, wherein said step (a) comprises the sub-steps of:

requesting a user of the personal computer to input the password if said security means is initialized; and continuously requesting the user of the personal computer to input the password if the input password is not valid.

13. A security method of a personal computer as claimed in claim 12, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

14. A security method of a personal computer as claimed in claim 4, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

15. A security method of a personal computer as claimed in claim 2, wherein said step (a) comprises the sub-steps of:

requesting a user of the personal computer to input the password if said security means is initialized; and continuously requesting the user of the personal computer to input the password if the input password is not valid.

16. A security method of a personal computer as claimed in claim 15, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

17. A security method of a personal computer as claimed in claim 2, wherein said step (b) comprises the sub-steps of:

determining whether said security means is the same as that initially installed in the personal computer and said hard disk is the same as that initially installed in the personal computer if the password is valid;

terminating the operation of the personal computer so as to prevent said hard disk from being booted if said security means and said hard disk are not the same as those initially installed in the personal computer; and selecting a partition of said hard disk in accordance with the password if said security means and said hard disk are the same as those initially installed in the personal computer.

18. A method of installing security means in a personal computer for security of the personal computer, comprising the steps of:

connecting said security means to a hard disk and a central controller of the personal computer;

storing original booting data of a boot sector of said hard disk in a special file;

installing new booting data in said boot sector;

copying the new booting data installed in said boot sector in said security means;

removing only a partition from the new booting data so as to prevent the personal computer from being used without said security means; and registering a password and an identification number of the personal computer in said hard disk and said security means.

* * * * *